(12) United States Patent
Kosaka

(10) Patent No.: US 8,738,259 B2
(45) Date of Patent: May 27, 2014

(54) MOVABLE BODY, TRAVEL DEVICE, AND MOVABLE BODY CONTROL METHOD

(75) Inventor: Yusuke Kosaka, Chofu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 793 days.

(21) Appl. No.: 12/511,528

(22) Filed: Jul. 29, 2009

(65) Prior Publication Data

US 2010/0030442 A1 Feb. 4, 2010

(30) Foreign Application Priority Data

Jul. 29, 2008 (JP) ................................. 2008-194844

(51) Int. Cl.
*G05D 1/02* (2006.01)

(52) U.S. Cl.
USPC ................... 701/70; 701/93; 701/38; 701/79; 701/84; 180/205.1; 180/206.1; 180/206.2; 180/206.3; 180/282; 180/7.1; 180/316

(58) Field of Classification Search
USPC ..................... 701/93, 98, 38, 79, 84; 318/625; 180/205.1, 206.1, 206.2, 206.3, 282; 180/7.1, 316, 315
See application file for complete search history.

(56) References Cited

U.S. PATENT DOCUMENTS

| | | | | |
|---|---|---|---|---|
| 3,399,742 | A * | 9/1968 | Malick | 180/21 |
| 5,971,091 | A * | 10/1999 | Kamen et al. | 180/218 |
| 6,288,505 | B1 * | 9/2001 | Heinzmann et al. | 318/139 |
| 6,571,892 | B2 * | 6/2003 | Kamen et al. | 180/8.2 |
| 7,900,725 | B2 * | 3/2011 | Heinzmann et al. | 180/65.1 |
| 2006/0231313 | A1 * | 10/2006 | Ishii | 180/218 |
| 2007/0132311 | A1 * | 6/2007 | Giazotto | 303/126 |
| 2008/0147254 | A1 * | 6/2008 | Vos et al. | 701/8 |
| 2008/0249672 | A1 * | 10/2008 | Cherepinsky | 701/7 |
| 2010/0171458 | A1 * | 7/2010 | Hamaguchi et al. | 318/625 |

(Continued)

FOREIGN PATENT DOCUMENTS

| | | |
|---|---|---|
| JP | 2004-295430 A | 10/2004 |
| JP | 2005-6435 A | 1/2005 |

(Continued)

OTHER PUBLICATIONS

Jin et al, Fault tolerant control for satellites with four reaction wheels, Mar. 2008, Control Engineering Practice 16, 1250-1258.*

(Continued)

*Primary Examiner* — Thomas Black
*Assistant Examiner* — Sara Nelson
(74) *Attorney, Agent, or Firm* — Kenyon & Kenyon LLP

(57) ABSTRACT

A movable body according to the present invention detects an operation state including attitude information of the movable body by using an operation state detector, generates a drive velocity command based on the detected attitude information and an attitude information command to be input, generates a torque command of the drive device based on the generated drive velocity command and a drive velocity detected by a drive velocity detector, and drives the drive device in accordance with the torque command generated by a velocity controller, to thereby move. In the movable body, the velocity controller performs velocity control so that the drive velocity detected by the drive velocity detector follows the drive velocity command generated by an attitude controller, and the attitude controller performs attitude control so that the attitude information detected by the operation state detector follows the attitude information command to be input.

8 Claims, 12 Drawing Sheets

(56) References Cited

U.S. PATENT DOCUMENTS

| | | | |
|---|---|---|---|
| 2010/0235028 A1* | 9/2010 | Ishii | 701/22 |
| 2010/0299044 A1* | 11/2010 | Miyake et al. | 701/96 |
| 2011/0297070 A1* | 12/2011 | Riggs et al. | 114/330 |

FOREIGN PATENT DOCUMENTS

| | | | |
|---|---|---|---|
| JP | 2006-1384 | A | 1/2006 |
| JP | 2006-001385 | A | 1/2006 |
| JP | 2006-131115 | | 5/2006 |
| JP | 2006131115 | A * | 5/2006 |
| JP | 2005-138630 | A | 6/2006 |
| JP | 2006-211899 | A | 8/2006 |
| JP | 2006-315666 | A | 11/2006 |
| JP | 2007-336785 | A | 12/2007 |
| JP | 4162995 | | 8/2008 |
| JP | 4291732 | | 4/2009 |

OTHER PUBLICATIONS

Jin et al., Fault tolerant control for satellites with four reaction wheels, Mar. 2008, Control Engineering Practice 16, 1250-1258.*

Sasaki et al., Forward and backward motion control of personal riding-type wheeled mobile platform, 2004, IEEE.*

Martinez et al., Optimization of Interval Type-2 Fuzzy Logic Controllers for a Perturbed Autonomous Wheeled Mobile Robot Using Genetic Algorithms, Jan. 1, 2008, Springer, pp. 3-18.*

Jin et al., "Fault tolerant control for satellites with four reaction wheels," Mar. 2008, Control Engineering Practice 16, 1250-1258.*

Office Action mailed Feb. 22, 2011 in Japanese Applicat8on No. 2008-194844 and verified English translation thereof.

\* cited by examiner

1 MAIN BODY

4 HANDLE
3B WHEEL
2B DRIVING UNIT
5 ATTITUDE DETECTION DEVICE
6 TURNING OPERATION DEVICE
1 MAIN BODY
3A WHEEL
2A DRIVING UNIT

1 MAIN BODY
4 HANDLE

8 BRAKE DETECTION DEVICE
7 BRAKE LEVER
4 HANDLE
3B WHEEL
2B DRIVING UNIT
5 ATTITUDE DETECTION DEVICE
6 TURNING OPERATION DEVICE
3A WHEEL
1 MAIN BODY
2A DRIVING UNIT

8 BRAKE DETECTION DEVICE
(POTENTIOMETER OR ROTARY ENCODER)

MOVABLE BODY, TRAVEL DEVICE, AND MOVABLE BODY CONTROL METHOD

BACKGROUND OF THE INVENTION

1. Field of the Invention

The present invention relates to a movable body, a travel device, and a movable body control method, and more particularly, to a movable body, a travel device, and a movable body control method for performing drive control based on own attitude information detected.

2. Description of Related Art

In recent years, there has been developed a movable body that detects own attitude information by using a gyro sensor, an acceleration sensor, or the like and performs drive control based on the detected attitude information. The movable body operates in accordance with an attitude control principle based on an inverted pendulum or in accordance with a ZMP (zero moment point) control principle for control on a two-legged robot, and detects its own attitude information from signals of an acceleration sensor and a gyro sensor mounted thereon. Then, the movable body operates a rotation command for a motor to maintain its own attitudes and transmits the rotation command data to a motor control device. Thus, the movable body can travel depending on a change in the center of gravity of a passenger while maintaining its own attitude based on the feedback control mentioned above.

For example, there has been proposed a travel device that travels while transporting a person and has various vehicle body compositions or vehicle structures for performing drive control based on own attitude information detected. For example, Japanese Unexamined Patent Publications Nos. 2006-211899 and 2006-315666 each disclose a coaxial two-wheel vehicle in which two wheels are coaxially provided. The coaxial two-wheel vehicle is in a structurally unstable state in a backward and forward direction and has a feature of stabilizing its attitude while controlling the wheels based on a feedback from an attitude sensor. In addition, the coaxial two-wheel vehicle is operated to move forwards or backwards or turn right or left in accordance with a command by shifting the center of gravity of a passenger, a command by tilting a step, a command from a control rod, or the like. Further, remote control by inputting a command from outside or autonomous locomotion on the basis of own trajectory planning is carried out in some cases.

It has now been discovered that a control system of a coaxial two-wheel vehicle that relates to the above invention requires a processing time period for computation to detect the attitude. Therefore, in order to realize a high-speed control cycle while maintaining a control performance, an attitude sensor that gives a rapid response and a controller (CPU (Central Processing Unit)) having a high computing power are required. Accordingly, an expensive system (CPU and attitude sensor) has to be used, leading to an increase in cost. In contrast, if a low-cost system is used, a control cycle slows, resulting in reduction in performance because of a loss of a control gain. For these reasons, there is a strong demand for a method of realizing a high-speed control cycle while maintaining a control performance with a low-cost system.

Hereinafter, a detailed description will be given on problems of a related coaxial two-wheel vehicle. In the related coaxial two-wheel vehicle, in a case where control on only at least one of a pitch angle and a pitch angular velocity of a vehicle is performed, or control on at least one of the pitch angle and the pitch angular velocity of the vehicle and control on at least one of a position, a velocity, a direction angle (yaw direction), and a direction velocity (yaw velocity) of the vehicle are performed at the same time, a torque command is generated based on a control system shown in FIG. 11 and is output to a motor amplifier in general. In an attitude controller 64 shown in FIG. 11, a vehicle pitch angle command, a vehicle pitch angular velocity command, and a vehicle position command, a vehicle velocity command, and the like are input, and control is performed based on deviations with a vehicle pitch angle, a vehicle pitch angular velocity, a vehicle position, a vehicle velocity, and the like that are detected by a detector 63. Examples of control by the attitude controller 64 include PID control, H infinity control, fuzzy control, and the like. In a turning controller 66, a yaw angle command, a yaw angular velocity command, and the like are input, and control is performed based on deviations with a vehicle yaw angle, a vehicle yaw angular velocity, and the like that are detected based on encoder information of a motor (not shown). Examples of control by the turning controller 66 include PD control, PID control, and the like.

FIG. 12 is a control block diagram showing a control system shown in FIG. 33 of Japanese Unexamined Patent Publication No. 2006-211899. The control system shown in FIG. 12 corresponds to a diagram that more specifically shows the control block diagram shown in FIG. 11. The attitude controller 64 shown in FIG. 11 is expressed by Expression (1) in paragraph 0013 of Japanese Unexamined Patent Publication No. 2006-211899 and a state feedback by gains K1 to K4 shown in FIG. 12. Further, the turning controller 65 shown in FIG. 11 is expressed by using gains K5 to K7 shown in FIG. 12, for example.

In the control system of the related coaxial two-wheel vehicle shown in FIG. 11, a torque command is obtained by performing an operation of addition or subtraction on a first torque command generated in the attitude controller 64 and a second torque command generated in the turning controller 66, and the torque command is output to a torque controller constituted of a motor amplifier, thereby performing drive control on wheels 62. Here, a control loop 71 for outputting the torque command includes a computation for attitude detection by the detector 63. Generally, a high-speed control cycle is required in the control loop 71 of the torque command, but the computation for the attitude detection takes time. Therefore, in order to complete the computation in the high-speed control cycle, a high-speed CPU (or attitude sensor capable of performing computation at high speed) is required, and thus the system becomes expensive. In contrast, in a case where the system is structured by a low-cost CPU (or low-cost attitude sensor) with the control cycle being slowed, harmful effects are caused in that the control performance relating to the pitch angle, the pitch angular velocity, the vehicle position, and the vehicle velocity is degraded (that is, the stability is lowered or command following capability is degraded) and a performance in the turning control is degraded (that is, a direction stability is lowered).

Further, when one of the wheels of the related coaxial two-wheel vehicle is away from the road surface during traveling, a load on the wheel that is away from the road surface decreases rapidly. Because robustness of the turning control is low, oscillations are generated between the wheel that is in contact with the ground and receives a larger load and the wheel that is away from the road surface and receives the smaller load, with the result that the vehicle may be vibrated in a turn direction and a dangerous state may be caused.

As described above, in the control system of the related coaxial two-wheel vehicle, the attitude detection processing that requires the computation time is included in the control loop of the torque command which requires the high-speed control cycle. For this reason, there is a problem in that the high-speed control cycle cannot be realized with the low-cost system while maintaining the control performance.

Accordingly, the present invention has an object to provide a movable body, a travel device, and a movable body control method that are capable of implementing higher-performance control by realizing the high-speed control cycle with a low-cost system while maintaining a control performance.

SUMMARY OF THE INVENTION

According to an aspect of the present invention, there is provided a movable body including a drive device, a drive velocity detector, an operation state detector, an attitude controller, and a velocity controller. The drive device drives a movable body. The drive velocity detector detects a drive velocity of the drive device. The operation state detector detects an operation state including attitude information of the movable body. The attitude controller generates a drive velocity command based on the attitude information detected by the operation state detector and an attitude information command to be input so that the attitude information detected follows the attitude information command to be input. The velocity controller generates a torque command of the drive device based on the drive velocity command generated by the attitude controller and the drive velocity detected by the drive velocity detector so that the drive velocity detected by the drive velocity detector follows the drive velocity command generated. In the movable device, the drive device is driven in accordance with the torque command generated by the velocity controller, to move the movable body.

With this structure, the attitude control by the attitude controller is performed so as to follow the attitude information command to be input, and the velocity control by the velocity controller only has to be performed so as to follow the drive velocity command generated by the attitude controller because an attitude detection processing that requires a computing time period is not included therein. Therefore, the velocity control by the velocity controller can realize a relatively high-speed control cycle as compared to the control by the attitude controller. That is, not by using a more expensive system (CPU and attitude sensor), but by using a CPU and an attitude sensor that are equivalent to those of the known technique, the attitude control by the attitude controller can realize the equivalent control performance, and at the same time, a low-cost, high-speed control cycle can be realized because the velocity control by the velocity controller is simple. Thus, by structuring the control system by the velocity controller capable of performing the high-speed control at a low cost in a control loop within the control system by the attitude controller, higher-performance control can be realized while reducing the cost of the entire system.

Further, the control system by the velocity controller is operated by a high-speed subordinate controller with respect to the controller that performs the attitude control by the attitude controller, with the result that a high robustness with respect to a load variation (load variation caused by a disturbance received from a road surface during traveling or being away from the road surface) can be realized. Therefore, stability in a traveling direction can be improved.

Further, the movable body may further include a turning controller that generates a turning velocity command based on a turning information command to be input. The attitude controller may generate an attitude velocity command based on the attitude information detected and the attitude information command to be input, the attitude velocity command generated by the attitude controller and the turning velocity command generated by the turning controller may be subjected to one of addition and subtraction, to be input to the velocity controller as the drive velocity command, and the velocity controller may perform velocity control so that the drive velocity detected by the drive velocity detector follows the drive velocity command generated. As a result, the attitude control, the velocity control, and the turning control can be performed at the same time while reducing the cost of the entire system, and higher-performance control can be realized.

Further, the movable body may further include a velocity information command setter that sets a velocity information command. The operation state detector may detect the operation state including velocity information and the attitude information of the movable body, the velocity information command setter may set the velocity information detected by the operation state detector as the velocity information command, and the attitude controller may generate the drive velocity command based on the attitude information detected and the velocity information command set by the velocity information command setter. As a result, the drive control during a normal drive and the drive control in the case where the velocity information command is set can be performed by the same control system.

Further, the movable body may further include a brake lever. The velocity information command setter may change, when the brake lever is operated, the set velocity information command in accordance with an operation amount of the brake lever and the velocity information detected by the operation state detector. As a result, the control during the normal drive and the velocity control in accordance with the operation of the brake lever can be performed at the same time, and the drive of the movable body can be more preferably controlled.

Further, the velocity information command setter may change, when the velocity information detected by the operation state detector exceeds a predetermined velocity limit range, the set velocity information command in accordance with the velocity information detected by the operation state detector. As a result, the velocity control in the case where the velocity limit range is exceeded can be further performed at the same time, and the drive of the movable body can be more preferably controlled.

According to another aspect of the present invention, there is provided a travel device including a driving unit, a main body, a wheel angular velocity detector, an attitude detector, an attitude controller, and a velocity controller. The driving unit separately drives a plurality of wheels that are coaxially disposed. The main body connects the plurality of wheels. The wheel angular velocity detector detects a relative angular velocity between the main body and the plurality of wheels as a wheel angular velocity. The attitude detector detects at least one of an attitude angle and an attitude angular velocity as attitude information of the main body. The attitude controller generates a wheel angular velocity command based on the attitude information detected by the attitude detector and an attitude information command to be input so that the attitude information detected follows the attitude information command to be input. The velocity controller generates a torque command of each of the plurality of wheels based on the wheel angular velocity command generated by the attitude controller and the wheel angular velocity detected by the wheel angular velocity detector so that the wheel angular velocity detected by the wheel angular velocity detector follows the wheel angular velocity command generated. The driving unit includes a motor that is driven in accordance with the torque command generated by the velocity controller, to travel the travel device.

With this structure, the attitude control by the attitude controller is performed so as to follow the attitude information to be input, and the velocity control by the velocity controller only has to be performed so as to follow the wheel angular velocity command generated by the attitude controller because an attitude detection processing that requires a computing time period is not included therein. Therefore, the velocity control by the velocity controller can realize a relatively high-speed control cycle as compared to the control by the attitude controller. That is, not by using a more expensive system (CPU and attitude sensor), but by using a CPU and an attitude sensor that are equivalent to those of the known technique, the attitude control by the attitude controller can realize the equivalent control performance, and at the same time, a low-cost, high-speed control cycle can be realized because the velocity control by the velocity controller is simple. Thus, by structuring the control system by the velocity controller capable of performing the high-speed control at a low cost in a control loop within the control system by the attitude controller, the high-performance attitude angle control, attitude angular velocity control, and vehicle velocity control can be performed at the same time and higher-performance control can be realized while reducing the cost of the entire system.

Further, the control system by the velocity controller is operated by a high-speed subordinate controller with respect to the controller that performs the attitude control by the attitude controller, with the result that a high robustness with respect to a load variation (load variation caused by a disturbance received from a road surface during traveling or being away from the road surface) can be realized. Therefore, stability in a traveling direction can be improved, and even when one of the wheels is away from the road surface during traveling, the stability can be obtained.

Further, the travel device may further include a turning controller that generates a turning velocity command based on a turning information command to be input. The attitude controller may generate an attitude velocity command based on the attitude information detected and the attitude information command to be input. The attitude velocity command generated by the attitude controller and the turning velocity command generated by the turning controller may be subjected to one of addition and subtraction, to be input to the velocity controller as a wheel angular velocity command. The velocity controller may perform velocity control so that the wheel angular velocity detected by the wheel angular velocity detector follows the wheel angular velocity command generated. As a result, attitude angle control, the attitude angular velocity control, and the vehicle velocity control can be performed at the same time and the higher-performance control can be performed while reducing the cost of the entire system.

Further, the travel device may further include a vehicle velocity detector and a vehicle velocity command setter. The vehicle velocity detector detects a vehicle velocity of the travel device based on the wheel angular velocity of the plurality of wheels that is detected by the wheel angular velocity detector and the attitude angular velocity detected by the attitude detector. The vehicle velocity command setter sets a vehicle velocity command. The vehicle velocity command setter may set the vehicle velocity detected by the vehicle velocity detector as the vehicle velocity command, and the attitude controller may generate the wheel angular velocity command based on the attitude information detected and the vehicle velocity command set by the vehicle velocity command setter. As a result, travel control during traveling and travel control in the case where the velocity information command is set can be performed by the same control system.

Further, the travel device may further include a brake lever. The vehicle velocity command setter may change, when the brake lever is operated, the set vehicle velocity command in accordance with an operation amount of the brake lever and the vehicle velocity detected by the vehicle velocity detector. As a result, the travel control during normal traveling and the vehicle velocity control in accordance with the operation of the brake lever can be performed by the same control system at the same time, and the drive of the travel device can be more preferably controlled.

Further, the vehicle velocity command setter may change, when the vehicle velocity detected by the vehicle velocity detector exceeds a predetermined velocity limit range, the set vehicle velocity command in accordance with the vehicle velocity detected by the vehicle velocity detector. As a result, the vehicle velocity control in the case where the velocity limit range is exceeded can be performed at the same time, and the drive of the travel device can be more preferably performed.

According to another aspect of the present invention, there is provided a method of controlling a movable body that moves by driving a drive device in accordance with a torque command to be generated while detecting a drive velocity of the drive device that drives the movable body and an operation state including attitude information of the movable body. The method includes generating a drive velocity command based on the attitude information detected and an attitude information command to be input and performing attitude control so that the attitude information detected follows the attitude information command to be input, and generating the torque command of the drive device based on the drive velocity command generated and the drive velocity detected and performing velocity control so that the drive velocity detected follows the drive velocity command generated.

By this method, the attitude control is performed so as to follow the attitude information command to be input, and the velocity control only has to be performed so as to follow the drive velocity command generated when the attitude control is performed, because an attitude detection processing that requires a computing time period is not included therein. Therefore, when the velocity control is performed, it is possible to realize a relatively high-speed control cycle as compared to the attitude control. That is, not by using a more expensive system (CPU and attitude sensor), but by using a CPU and an attitude sensor that are equivalent to those of the known technique, the attitude control can obtain the equivalent control performance, and at the same time, a low-cost, high-speed control cycle can be realized because the velocity control is simple. Thus, by structuring the control system of the velocity control capable of performing the high-speed control at a low cost in a control loop within the control system by the attitude controller, higher-performance control can be realized while reducing the cost of the entire system.

Further, the control system by the velocity controller is operated by a high-speed subordinate controller with respect to the controller that performs the attitude control by the attitude controller, with the result that a high robustness with respect to a load variation (load variation caused by a disturbance received from a road surface during traveling or being away from the road surface) can be realized. Therefore, stability in a traveling direction can be improved, and even when one of the wheels is away from the road surface during the traveling, the stability can be obtained.

According to the aspects of the present invention, by realizing the high-speed control cycle while maintaining the control performance with the use of the low-cost system, it is possible to provide the movable body, the travel device, and the movable body control method that can realize higher-performance control.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
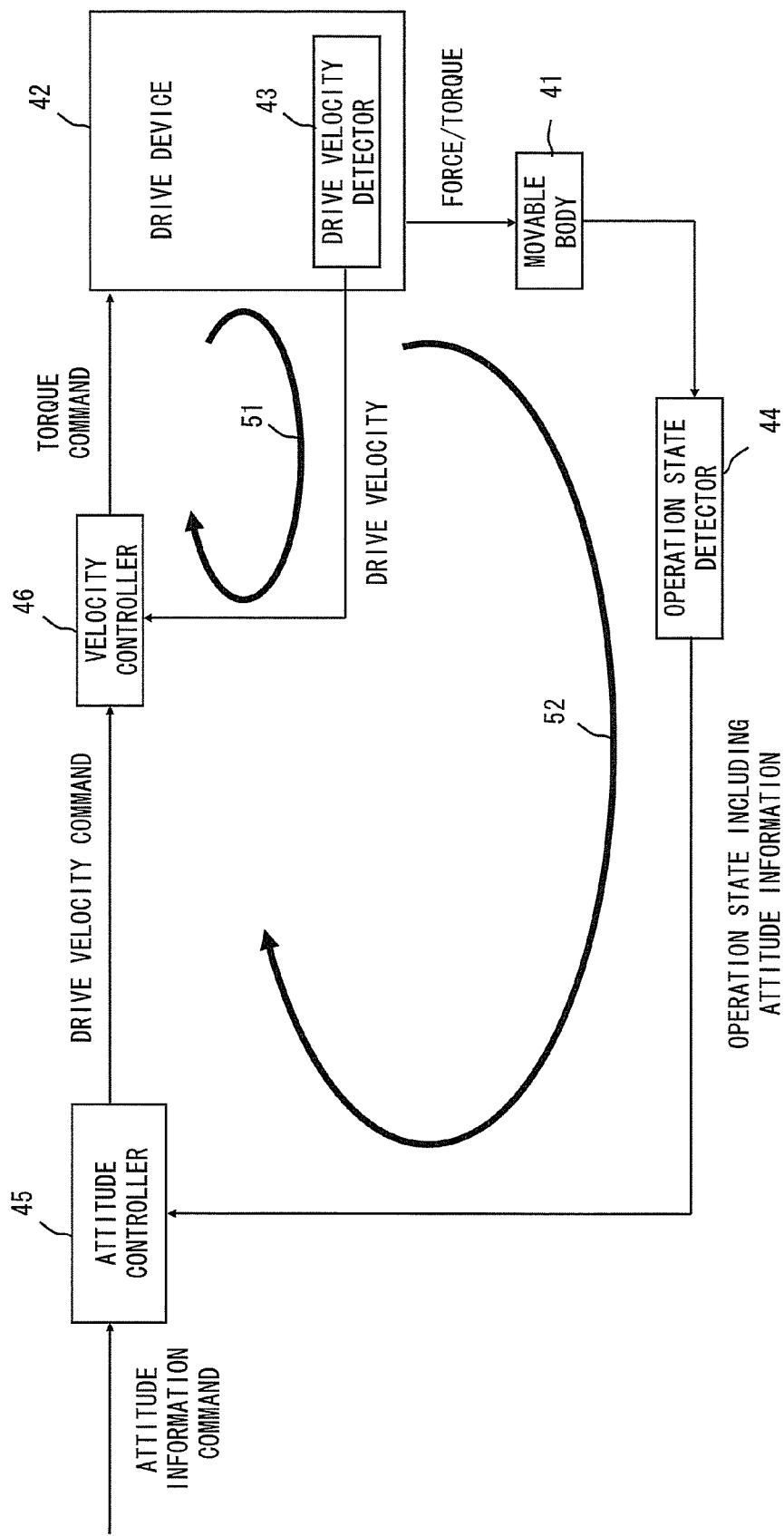
FIG. 1 is a control block diagram showing an outline of a control system of a movable body according to the present invention.

Hereinafter, the present invention will be described with reference to the drawings. First, the outline of the present invention will be described prior to a detailed description of embodiments of the present invention. FIG. 1 is a control block diagram showing the outline of a control system of a movable body according to the present invention. A movable body 41 according to the present invention includes a drive device 42, a drive velocity detector 43, an operation state detector 44, an attitude controller 45, and a velocity controller 46. The drive device 42 drives the movable body 41. The drive velocity detector 43 detects a drive velocity of the drive device 42. The operation state detector 44 detects an operation state including attitude information of the movable body 41. The attitude controller 45 generates a drive velocity command based on the detected attitude information and an attitude information command to be input. The velocity controller 46 generates a torque command of the drive device 42 based on the generated drive velocity command and the drive velocity detected by the drive velocity detector. The movable body 41 according to the present invention moves by driving the drive device 42 in accordance with the torque command generated by the velocity controller 46. The attitude controller 45 of the movable body according to the present invention performs attitude control so that the attitude information detected by the operation state detector 44 follows the attitude information command to be input, and the velocity controller 46 performs velocity control so that the drive velocity detected by the drive velocity detector 43 follows the drive velocity command generated by the attitude controller 45.

Thus, by providing, inside a control loop 52 that uses the attitude controller 45, a control loop 51 that uses the velocity controller 46 capable of increasing speed at a low cost, control that provides a higher performance can be performed while reducing the cost of an entire system.

Further, a control system that uses the velocity controller 46 is operated by a subordinate controller whose speed is higher than a controller that performs the attitude control by using the attitude controller 45, thereby making it possible to realize high robustness with respect to a load variation (load variation caused by disturbance from a road surface or by being away from the road surface during traveling). Thus, stability in a traveling direction is improved, and the movable body can be stable even in a case where one of wheels thereof is away from the road surface during traveling.

Embodiment 1

Figure 2A:
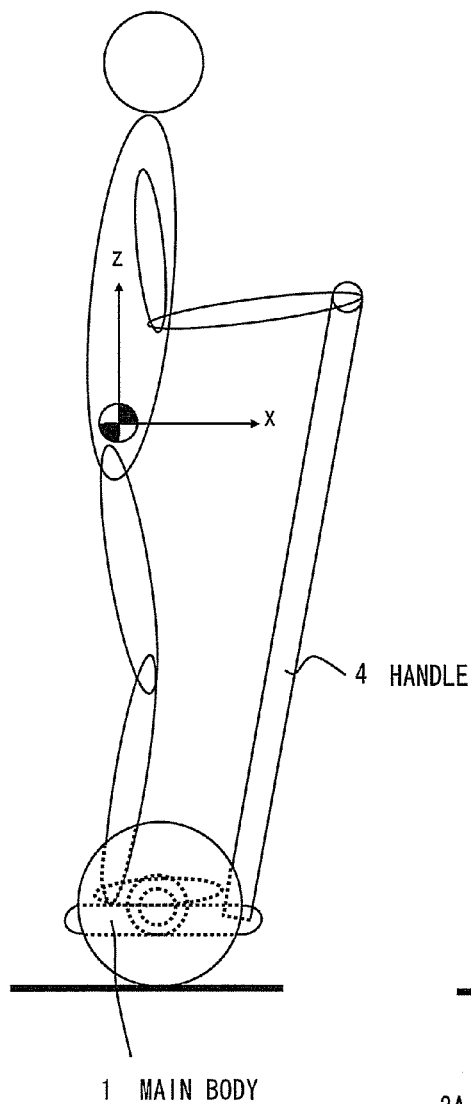
FIG. 2A is a diagram showing a structure of an embodiment of a travel device according to Embodiment 1 of the present invention.
Figure 2B:
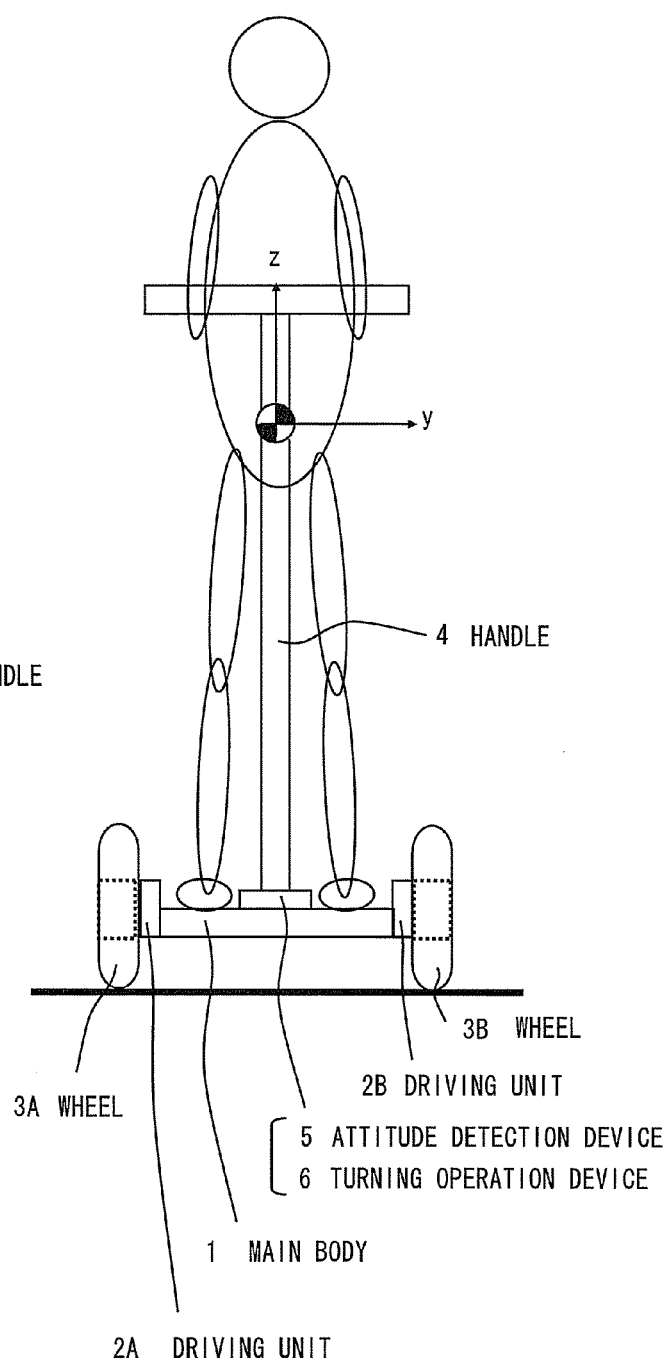
FIG. 2B is a diagram showing the structure of the embodiment of the travel device according to Embodiment 1 of the present invention.

FIGS. 2A and 2B are diagrams each showing a structure of a travel device according to Embodiment 1 of the present invention. It should be noted that FIG. 2A is a front view and FIG. 2B is a side view. In FIGS. 2A and 2B, the travel device according to Embodiment 1 is a coaxial two-wheel vehicle having wheels 3A and 3B in parallel to each other coaxially with respect to a main body 1 serving as a part on which a passenger stands.

It should be noted that a coordinate system with respect to the entire coaxial two-wheel vehicle, which is used in the following description, is set so that a direction perpendicular to an axle thereof corresponds to an X axis, an axle direction corresponds to a Y axis, and a vertical direction corresponds to a Z axis as shown in FIGS. 2A and 2B. Further, a pitch axis is defined as a rotation direction around the axle (around the Y axis), and a yaw axis is defined as a rotation direction in an X-Y plane in a top view of the vehicle.

The travel device according to Embodiment 1 includes the main body 1, a pair of driving units 2A and 2B, the wheels 3A and 3B, a handle 4, an attitude detection device 5, and a turning operation device 6. The pair of driving units 2A and 2B is coaxially provided to the main body 1. The wheels 3A and 3B are subjected to rotary drive by the driving units 2A and 2B, respectively. The handle 4 has a T shape so as to be held by the passenger. The attitude detection device 5 detects a forward and backward tilt (around the Y axis) of the main body 1. The turning operation device 6 is used for giving a command of a turning operation. Further, the main body 1 is provided with a control device (not shown) that controls the vehicle (to be described later). It should be noted that the main body 1 may include a sensor or a switch (not shown) that detects the presence of a rider.

Figure 3:
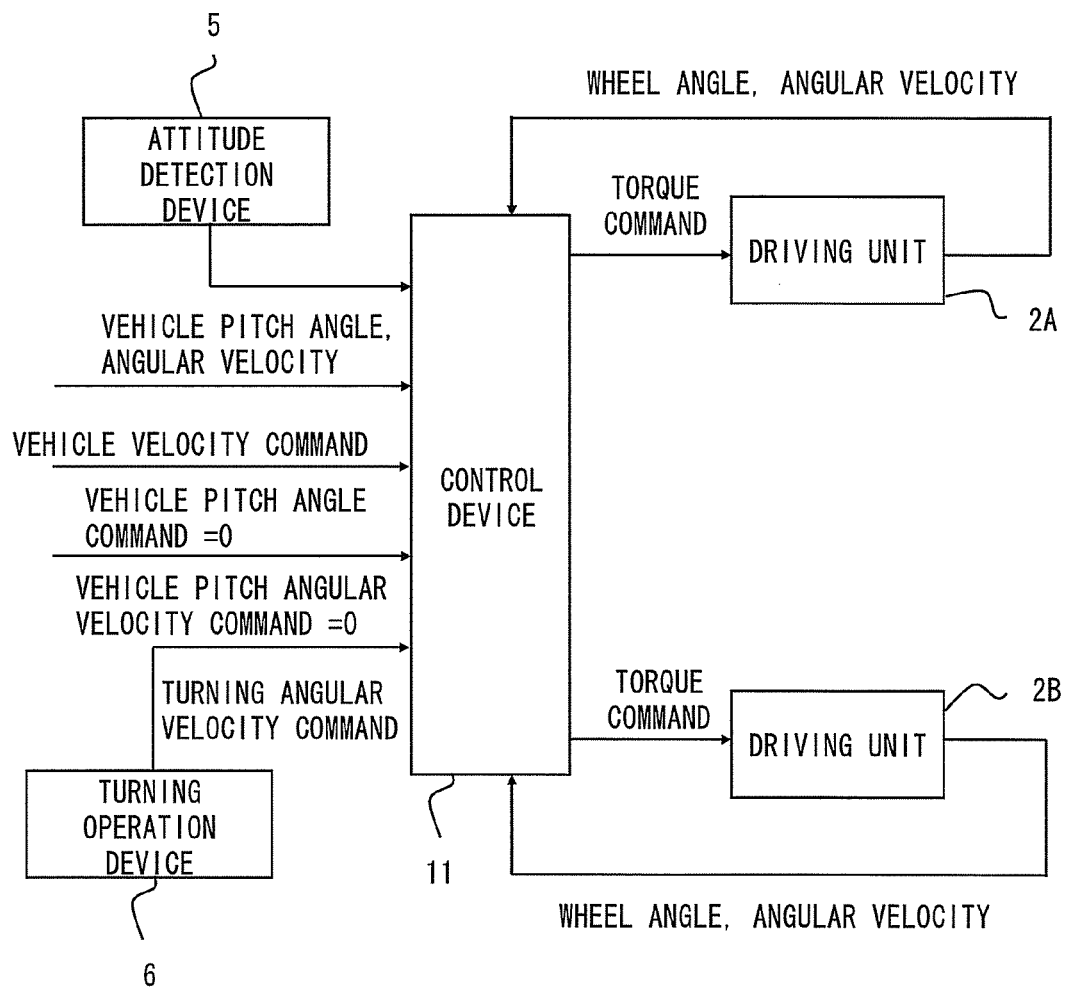
FIG. 3 is a control block diagram showing a structure of vehicle control of a coaxial two-wheel vehicle according to Embodiment 1.

FIG. 3 is a block diagram showing a structure of vehicle control of the coaxial two-wheel vehicle according to Embodiment 1. The attitude detection device 5 detects attitude information of the main body 1. The attitude information of the main body 1 includes at least one of an attitude angle (vehicle pitch angle) and an attitude angular velocity (vehicle pitch angular velocity). In addition, an attitude information command of the main body 1 is input to the control device 11. The attitude information command of the main body 1 includes at least one of an attitude angle command (vehicle pitch angle command) and an attitude angular velocity command (vehicle pitch angular velocity command).

The turning operation device 6 generates a turning angle command and a turning angular velocity command of the vehicle as a turn information command. The turning operation device 6 outputs, to the control device 11, at least one of the turning angle command and the turning angular velocity command thus generated. In the following, a description will be given on the assumption that at least the turning angular velocity command is output to the control device 11. For example, in response to an operation of the handle 4 by the passenger or an operation of a turn handle (not shown) by the passenger, the turning operation device 6 generates the turning angle command and the turning angular velocity command depending on the amount of the operation. Further, for the turning operation device 6, the technique (Japanese Unexamined Patent Publication No. 2006-315666) that has already been proposed by the applicant of the present invention may be employed. In this technique, a turning command is input depending on a roll angle of a vehicle tilted by a shift of the center of gravity of a passenger. It should be noted that the turning angular velocity command will be described as a yaw angular velocity command in the following.

The control device 11 performs control so that the vehicle stably follows target values (vehicle pitch angle command, vehicle pitch angular velocity command, and yaw angular velocity command). That is, the control device 11 calculates a drive torque necessary for stabilization of a total system of the travel device so as to prevent it from falling down based on the target values and information input from the attitude detection device 5 and the turning operation device 6, to thereby drive motors of the driving units 2A and 2B. A wheel angle and a wheel angular velocity of each of the wheels 3A and 3B with the rotation of the motors of the driving units 2A and 2B are fed back to the control device 11. On the basis of the structure of the vehicle control as described above, the coaxial two-wheel vehicle moves back and forth when the passenger shifts the center of gravity backward and forward and turns right and left when the passenger operates the turning operation device 6.

Figure 4:
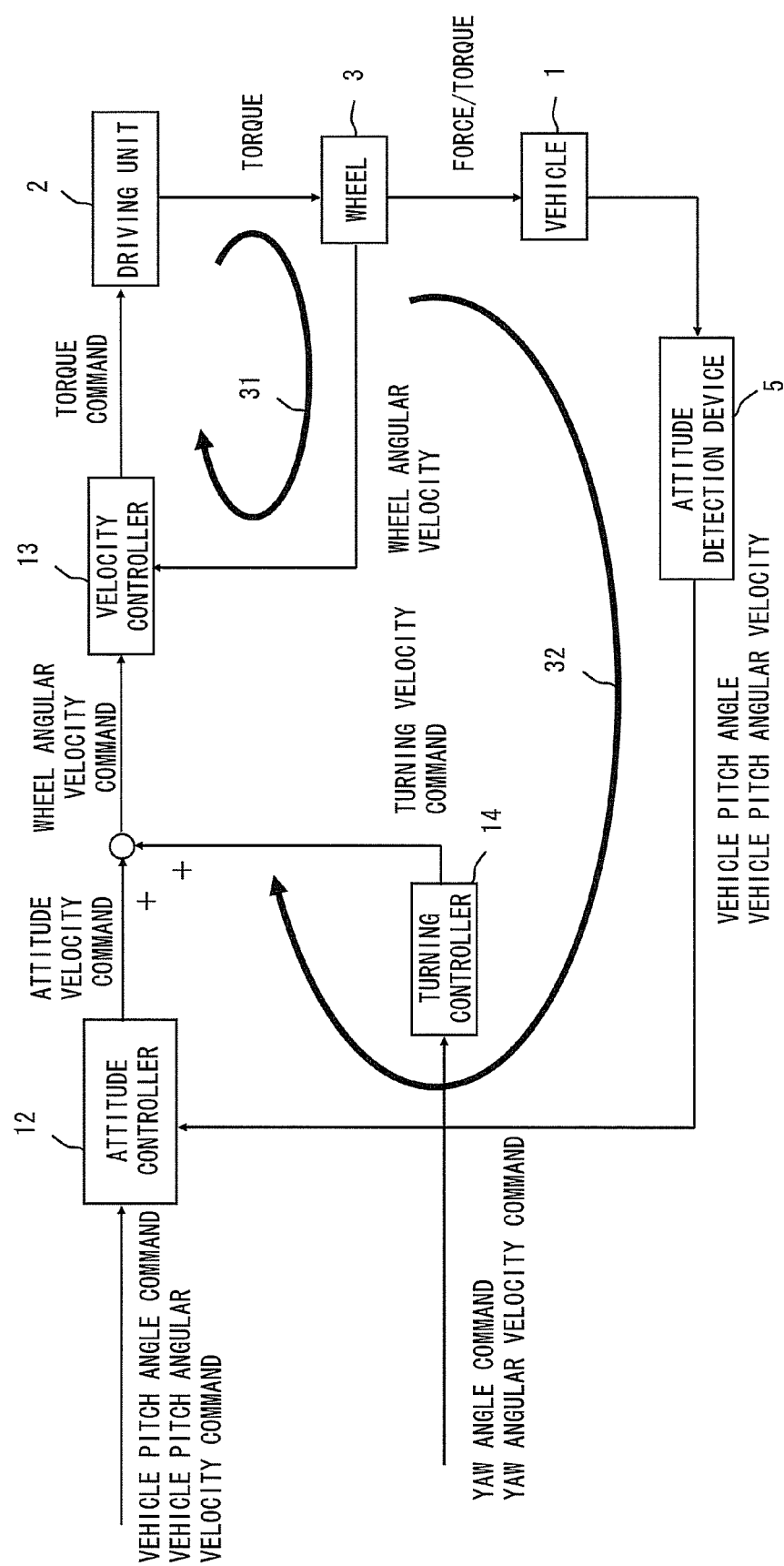
FIG. 4 is a control block diagram showing a structure of an operation control system of the coaxial two-wheel vehicle according to Embodiment 1.
Figure 5:
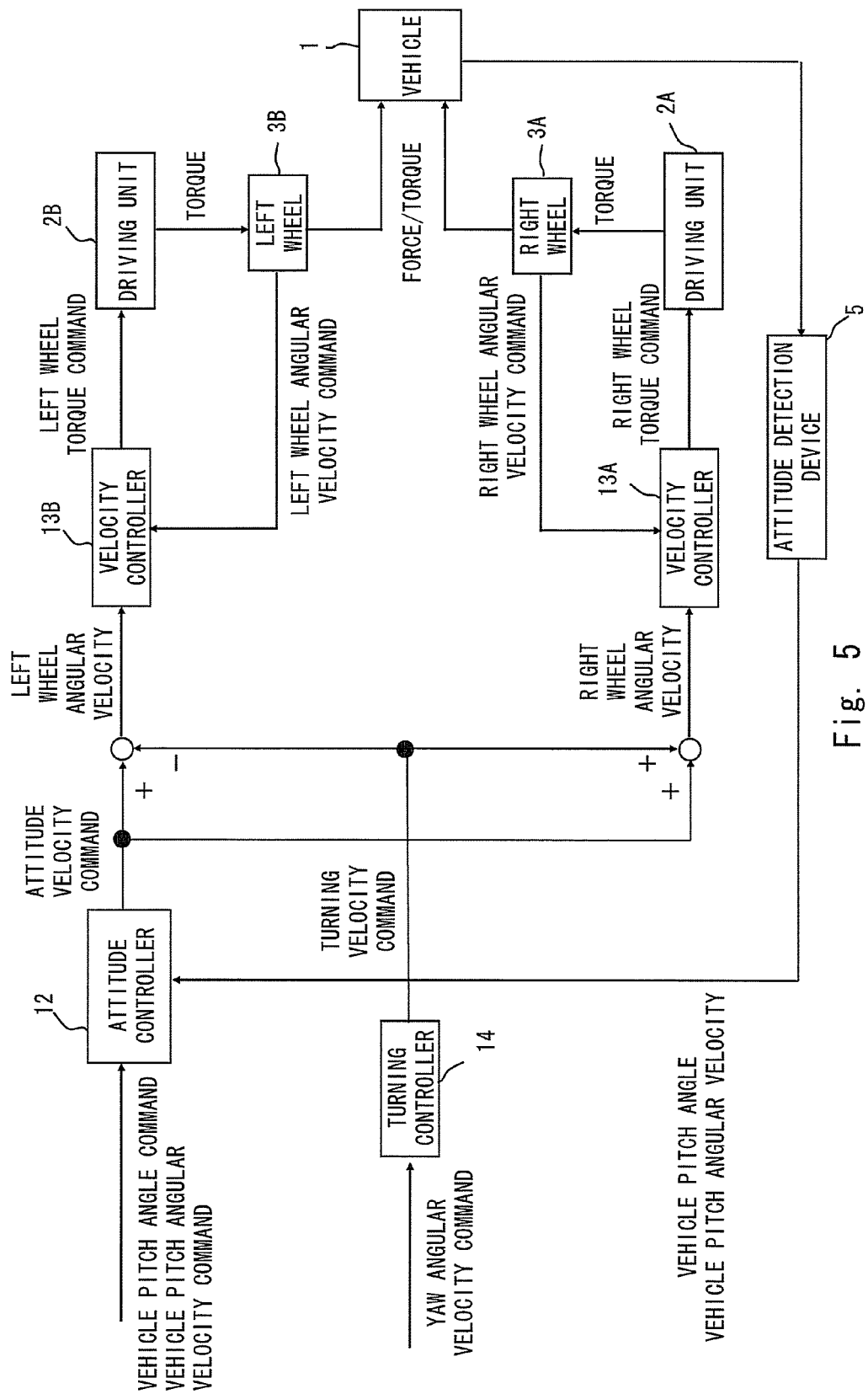
FIG. 5 is a control block diagram showing a structure of an operation control system of the coaxial two-wheel vehicle according to Embodiment 1.

Hereinafter, with reference to FIGS. 4 and 5, an operation control of the vehicle will be described in detail. FIG. 4 is a control block diagram showing an operation control system of the coaxial two-wheel vehicle according to Embodiment 1. FIG. 5 is a diagram for explaining more specifically to the driving units 2A and 2B and the wheels 3A and 3B in the operation control system shown in FIG. 4.

First, a description will be given on variables used in the following description. In the following, $\beta$ represents the vehicle pitch angle and $\beta'$ represents the vehicle pitch angular velocity. Further, x represents a position of the vehicle, and x' represents a velocity of the vehicle. The vehicle pitch angle $\beta$, the vehicle pitch angular velocity $\beta'$, the vehicle position x, and the vehicle velocity x' indicate detection values. In addition, $\beta r$ represents the vehicle pitch angle command and $\beta'r$ represents the vehicle pitch angular velocity command. xr represents a vehicle position command, and x'r represents a vehicle velocity command. $\gamma'r$ represents a yaw angular velocity command for the vehicle. The vehicle pitch angle command $\beta r$, the vehicle pitch angular velocity command $\beta'r$, the vehicle position command xr, the vehicle velocity command x'r, and the yaw angular velocity command $\gamma'r$ indicate command values as target values. That is, the variables with suffix r indicate the command values and the variables without suffix r indicate the detection values. Further, 2L represents a tread width, and Rw represents a wheel radius. It should be noted that, in Embodiment 1, the operation control of the vehicle in FIG. 4 shows an operation control in a case of normal traveling and at least the vehicle pitch angle command and the vehicle pitch angular velocity command are input to an attitude controller 12.

In FIG. 4, the driving unit 2 separately drives the plurality of wheels 3 that are coaxially disposed. The driving unit 2 includes a motor and an amplifier for driving the wheels 3, and performs torque control in response to a torque command to be input. A torque is applied to the wheels 3 with the rotation of the motor. In addition, a reaction force of the torque is applied to the main body 1 of the vehicle with the rotation of the motor, and a reaction force from the ground is also applied to the main body 1 of the vehicle with the rotation of the wheels 3.

A wheel angular velocity detector (not shown) detects a wheel angle as a relative angle and a wheel angular velocity as a relative angular velocity between the main body 1 and the plurality of wheels 3. The wheel angular velocity detector detects the wheel angle and the wheel angular velocity from encoder information provided on a rotation shaft of the motor, for example.

The attitude detection device 5 detects the vehicle pitch angle and the vehicle pitch angular velocity of the main body 1. The attitude detection device 5 detects the vehicle pitch angle and the vehicle pitch angular velocity by using a gyro sensor or an acceleration sensor. It should be noted that a description is given on the assumption that the attitude detection device 5 detects both the vehicle pitch angle and the vehicle pitch angular velocity, but the attitude detection device 5 may detect only the vehicle pitch angle or only the vehicle pitch angular velocity.

The attitude controller 12 performs attitude control so that the vehicle pitch angle and the vehicle pitch angular velocity that are detected by the attitude detection device 5 follow the vehicle pitch angle command and the vehicle pitch angular velocity command that are to be input. In other words, the attitude controller 12 generates the attitude velocity command based on the vehicle pitch angle and the vehicle pitch angular velocity that are detected by the attitude detection device 5 and based on the vehicle pitch angle command and the vehicle pitch angular velocity command that are to be input, and performs control relating to the attitude velocity command.

More specifically, the attitude controller 12 obtains a difference between the vehicle pitch angle command $\beta r$ to be input and the vehicle pitch angle $\beta$ detected by the attitude detection device 5 and a difference between the vehicle pitch angular velocity command $\beta'r$ and the vehicle pitch angular velocity $\beta'$ detected by the attitude detection device 5, and performs PD (proportional differential) control so that the differences converge into 0. Generally, the values of the vehicle pitch angle command $\beta r$ and the vehicle pitch angular velocity command $\beta'r$ are input as 0, and attitude control is performed so that the vehicle pitch angle β and the vehicle pitch angular velocity β' that are caused due to the shift of the center of gravity by the passenger are maintained at 0. The attitude controller 12 follows the PD control to calculate the attitude velocity command by using the following expression (1). In the expression (1), Kpp represents a proportional gain and Kdp represents a differential gain.

$$\text{Attitude velocity command} = Kpp(\beta r - \beta) + Kdp(\beta' r - \beta') \quad (1)$$

Depending on the control gains, a following performance of the motor that responds to the vehicle pitch angle command βr and the vehicle pitch angular velocity command β'r is changed. For example, if the proportional gain Kpp is reduced, a motor rotor moves with a slow following delay. Meanwhile, if the proportional gain Kpp is increased, the motor rotor shows a high-speed following performance. As described above, it is possible to adjust a response time with respect to degrees of the difference between the vehicle pitch angle command βr and the vehicle pitch angle β actually detected and the difference between the vehicle pitch angular velocity command β'r and the vehicle pitch angular velocity β' depending on the change in the control gains. It should be noted that, in the attitude controller 12, the control is not limited to the PD control and may instead be H infinity control, fuzzy control, or the like.

A turning controller 14 generates a turning velocity command based on the yaw angular velocity command to be input. The yaw angular velocity command is input by using the turning operation device 6 described above. The turning controller 14 uses the tread width 2L and the wheel radius Rw of the vehicle, thereby dividing the yaw angular velocity command Γ'r to be input, into the turning velocity command to each of the wheels 3. The turning controller 14 calculates the turning velocity command by using the following expression (2).

$$\text{Turning velocity command} = (L\gamma'r)/Rw \quad (2)$$

The attitude velocity command generated by the attitude controller 12 and the turning velocity command generated by the turning controller 14 are added by an adder (or subtracted by a subtractor), and the obtained value is input as the wheel angular velocity command to a velocity controller 13 (13A and 13B). In a case where the wheel angular velocity command is generated to the right wheel 3A and the left wheel 3B as shown in FIG. 5, the angular velocity commands for the left wheel and the right wheel are calculated, by using the following expressions (3) and (4), from the attitude velocity command obtained from the expression (1) and the turning velocity command obtained from the expression (2).

$$\text{Left wheel angular velocity command} = \text{attitude velocity command} - \text{turning velocity command} \quad (3)$$

$$\text{Right wheel angular velocity command} = \text{attitude velocity command} + \text{turning velocity command} \quad (4)$$

The velocity controllers 13A and 13B each obtain differences between the wheel angular velocity commands and the wheel angular velocities detected by the wheel angular velocity detector, performs the PI (proportional integral) control so that the differences converge into 0, and performs velocity control so that a detection value coincides with the command value. That is, the velocity controllers 13A and 13B each generate torque commands for the plurality of wheels 3 based on the wheel angular velocity commands to be input and the wheel angular velocities detected by the wheel angular velocity detector, and output, to the driving unit 2, the torque commands thus generated. The velocity controllers 13A and 13B perform the simple PI control or PD control based on the encoder information of the motor, with the result that a sufficiently high-speed control cycle can be realized by a low-cost CPU.

By using the control system described above, both the attitude control depending on the shift of the weight of the passenger and the turning control depending on the operation by the passenger or the shift of the weight thereof can be carried out at the same time.

Embodiment 2

Figure 6A:
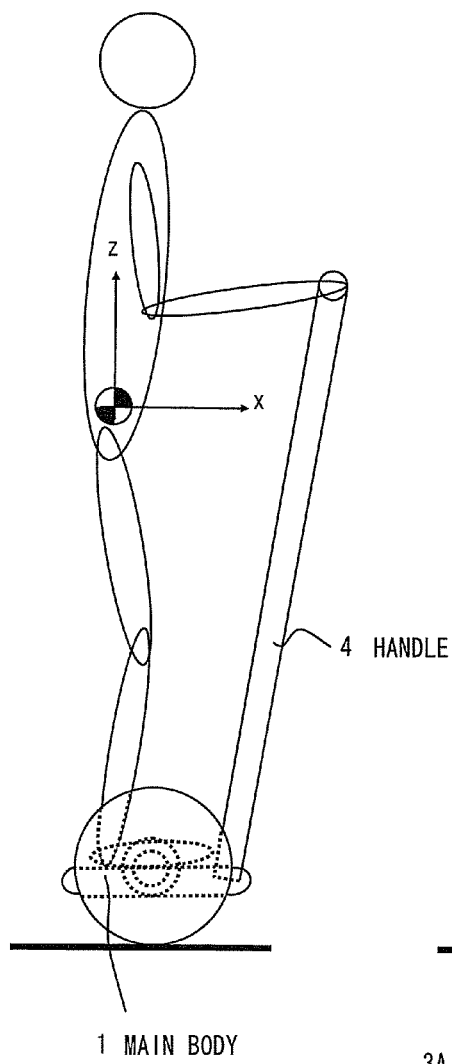
FIG. 6A is a diagram showing a structure of an embodiment of a travel device according to Embodiment 2 of the present invention.
Figure 6B:
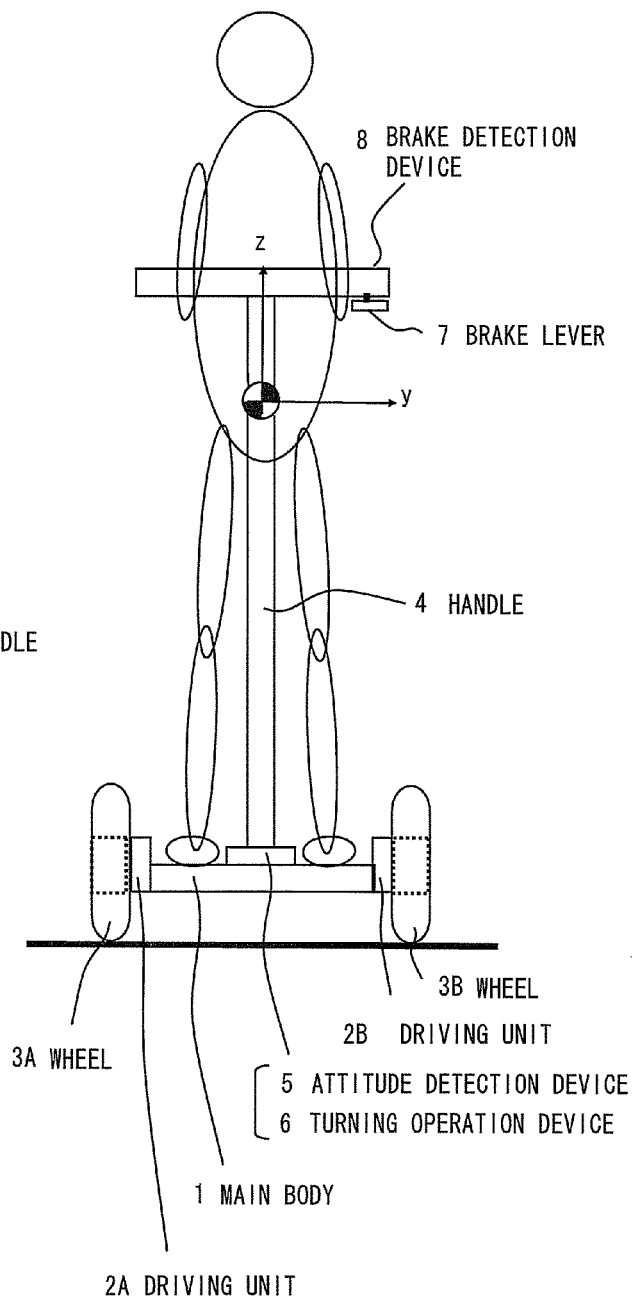
FIG. 6B is a diagram showing the structure of the embodiment of the travel device according to Embodiment 2 of the present invention.

FIGS. 6A and 6B are diagrams each showing a structure of a travel device according to Embodiment 2 of the present invention. It should be noted that FIG. 6A shows a front view and FIG. 6B shows a side view. As shown in FIGS. 6A and 6B, the travel device according to Embodiment 2 is a coaxial two-wheel vehicle having the wheels 3A and 3B that are provided in parallel to each other coaxially with respect to the main body 1 on which the passenger stands.

The travel device according to Embodiment 2 includes the main body 1, the pair of driving units 2A and 2B, the wheels 3A and 3B, the handle 4, the attitude detection device 5, and the turning operation device 6. The pair of driving units 2A and 2B is coaxially provided to the main body 1. The wheels 3A and 3B are subjected to rotary drive by the driving units 2A and 2B, respectively. The handle 4 has a T shape so as to be held by the passenger. The attitude detection device 5 detects a forward and backward tilt of the main body 1. The turning operation device 6 is used for giving a command of a turning operation. Further, the main body 1 is provided with a control device (not shown) that controls the vehicle (described later). It should be noted that the main body 1 may include a sensor or a switch (not shown) for telling whether the passenger gets on the vehicle. Furthermore, the travel device according to Embodiment 2 includes a brake lever 7 and a brake detection device 8. The brake lever 7 is provided at an end of the handle 4, and the brake detection device 8 detects operation information (operation amount and operation velocity) of the brake lever 7.

Figure 7A:
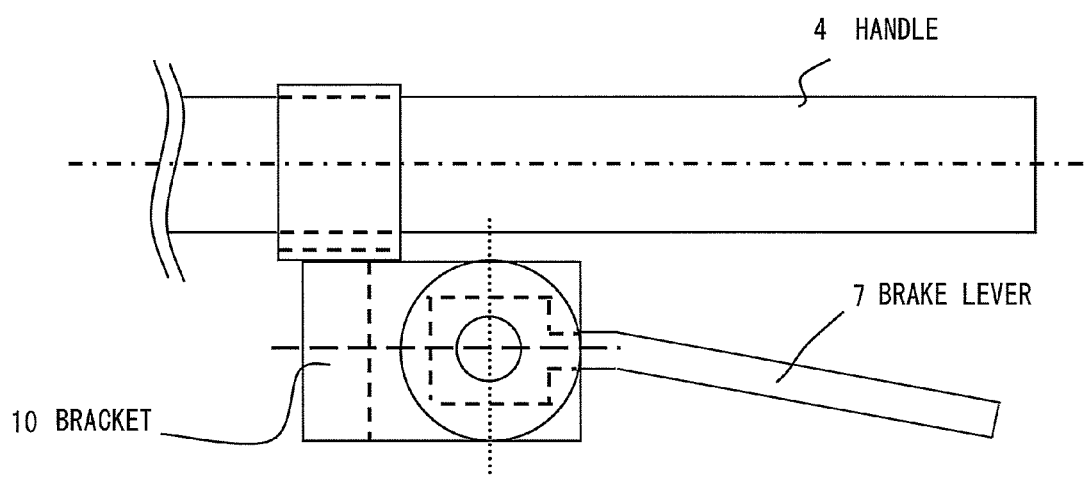
FIG. 7A is a diagram showing a structure of a main part of the travel device according to Embodiment 2 of the present invention.
Figure 7B:
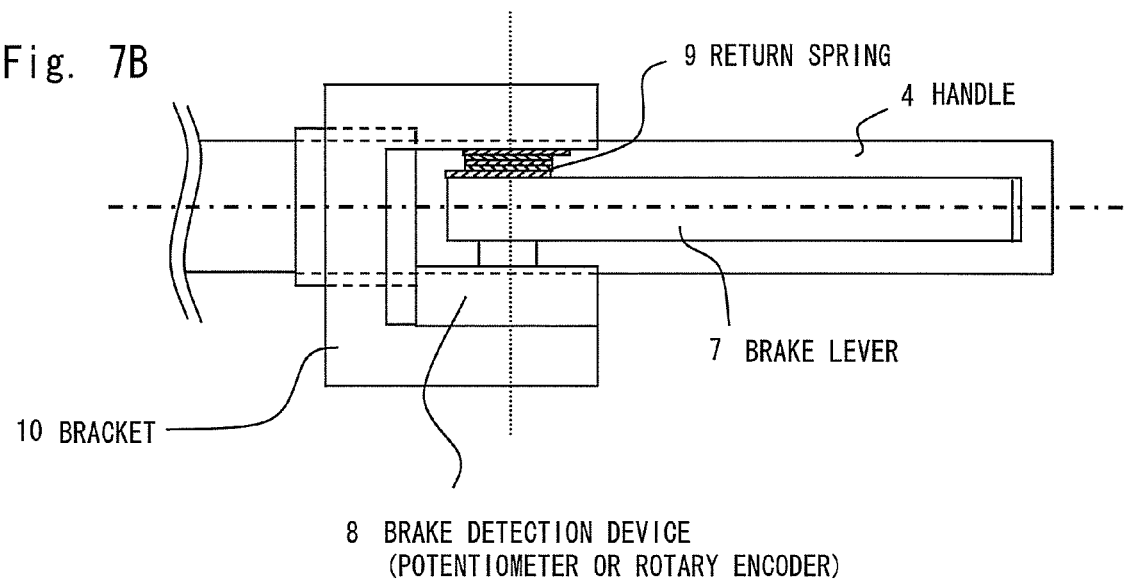
FIG. 7B is a diagram showing the structure of the main part of the travel device according to Embodiment 2 of the present invention.

FIGS. 7A and 7B are diagrams each showing an example of a structure around the brake lever 7. It should be noted that FIG. 7A shows a top view and FIG. 7B shows a side view. As shown in FIGS. 7A and 7B, the brake lever 7 is attached to the handle 4, and the operation amount and the operation velocity of the brake lever 7 are detected by the brake detection device 8 serving as a potentiometer or a rotary encoder. In addition, the brake lever 7 is provided with a return spring 9. The brake detection device 8 and the return spring 9 are contained in a bracket 10.

Figure 8:
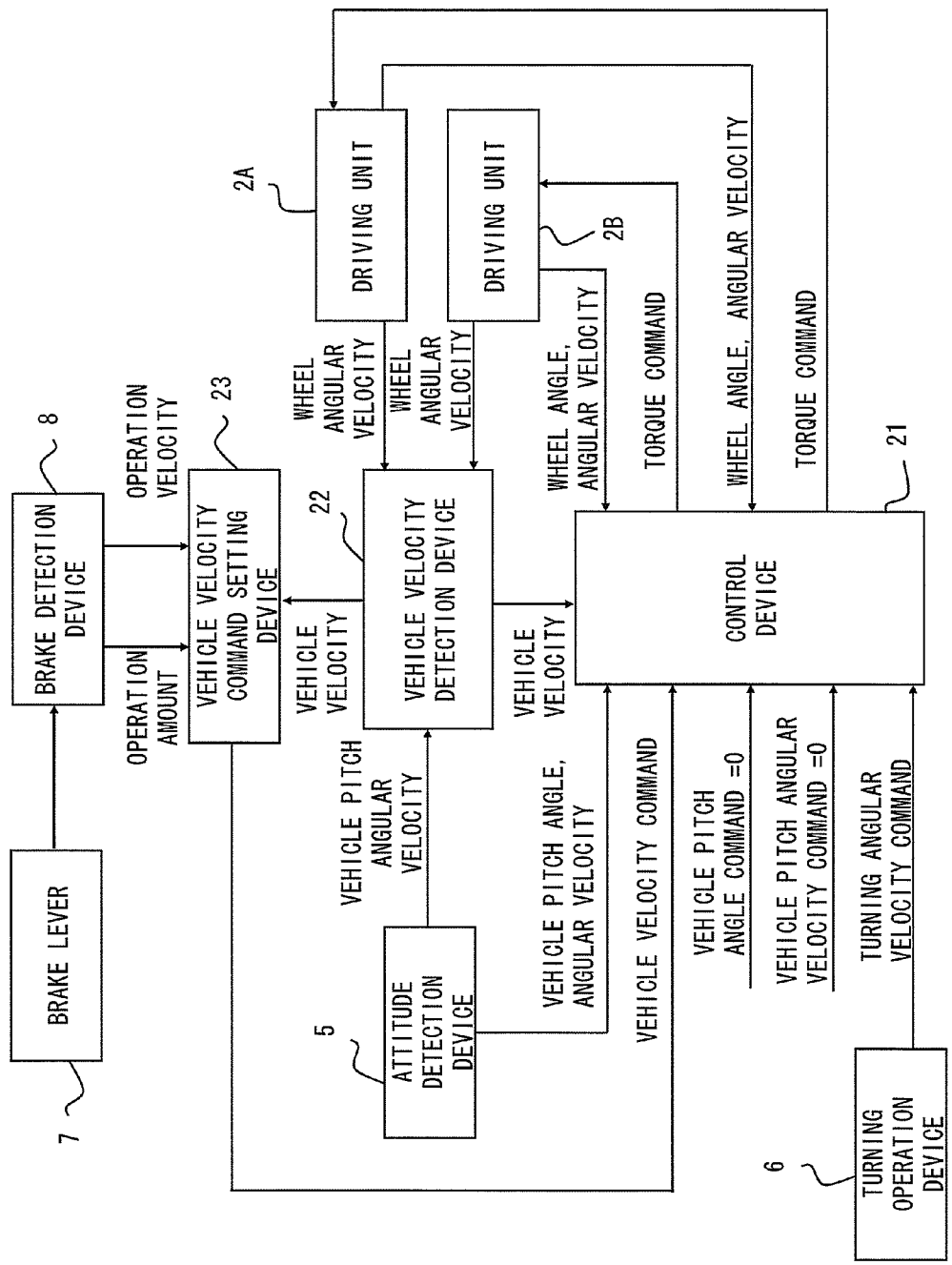
FIG. 8 is a block diagram showing a structure of vehicle control of a coaxial two-wheel vehicle according to Embodiment 2.

FIG. 8 is a block diagram showing a structure of vehicle control of the coaxial two-wheel vehicle according to Embodiment 2. The attitude detection device 5 detects the vehicle pitch angle and the vehicle pitch angular velocity. The turning operation device 6 generates the turning angle command and the turning angular velocity command of the vehicle, and outputs at least the turning angular velocity command to a control device 21. In response to, for example, an operation of the handle 4 by the passenger or an operation of a turn handle (not shown) by the passenger, the turning operation device 6 generates the turning angle command and the turning angular velocity command in accordance with the operation amount. Further, for the turning operation device 6, the technique in which a turning command is input depending on a roll angle of a vehicle tilted by a shift of the center of gravity of a passenger may be used. It should be noted that the turning angular velocity command will be described as the yaw angular velocity command in the following.

The control device 21 performs control so that the vehicle stably follows target values (vehicle pitch angle command, vehicle pitch angular velocity command, vehicle velocity command, and yaw angular velocity command). That is, the control device 21 calculates a drive torque necessary for stabilization of a total system of the travel device so as to prevent it from falling down based on the target values and information input from the attitude detection device 5 and the turning operation device 6, to thereby drive motors of the driving units 2A and 2B. The wheel angle and the wheel angular velocity of each of the wheels 3A and 3B with the rotation of the motors of the driving units 2A and 2B are fed back to the control device 21. On the basis of the structure of the vehicle control as described above, the coaxial two-wheel vehicle moves back and forth when the passenger shifts the center of gravity backward and forward and turns right and left when the passenger operates the turning operation device 6.

When the passenger operates the brake lever 7 during traveling, the brake detection device 8 detects the operation amount and the operation velocity of the operated brake lever 7. A vehicle velocity detection device 22 as a vehicle velocity detector obtains a current vehicle velocity from the wheel angular velocity that is a relative angular velocity between the main body 1 and the wheels and is detected by the driving units 2A and 2B and the vehicle pitch angular velocity detected by the attitude detection device 5. Then, a vehicle velocity command setting device 23 as a vehicle velocity command setter determines a deceleration based on outputs of the brake detection device 8 and the vehicle velocity detection device 22, and thus determines the vehicle velocity command. That is, through the processing described above, the vehicle velocity command setting device 23 appropriately adjusts the deceleration depending on the degrees of the brake operation amount and the brake operation velocity. Thus, the control device 21 causes the vehicle to stably follow the vehicle pitch angle command (=0, that is, to be kept in a horizontal position), the vehicle pitch angular velocity command (=0, that is, to be kept at a current angle), the vehicle velocity command, and the yaw angular velocity command.

It should be noted that the vehicle velocity command setting device 23 may change the set vehicle velocity command depending on the vehicle velocity detected by the vehicle velocity detection device 22, in not only the case where the passenger operates the brake lever 7 but also a case where the vehicle velocity detected by the vehicle detection device 22 exceeds a predetermined velocity limit range. In addition, the vehicle velocity command setting device 23 sets the vehicle velocity detected by the vehicle velocity detection device 22 as the vehicle velocity command during normal traveling, thereby making it possible to perform travel control during normal traveling and velocity control in accordance with the operation of the brake lever based on the same control system at the same time.

Figure 9:
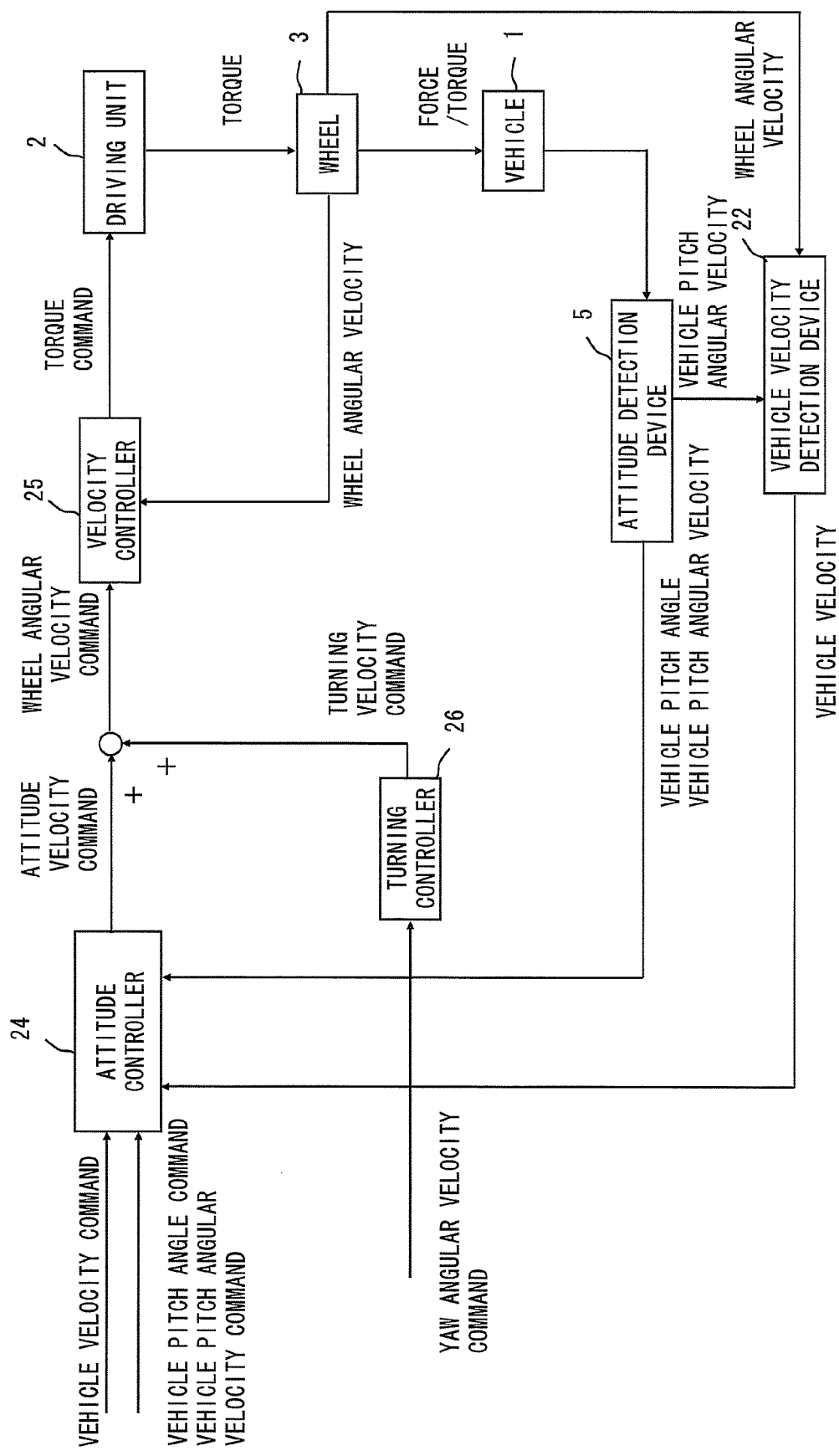
FIG. 9 is a control block diagram showing a structure of an operation control system of the coaxial two-wheel vehicle according to Embodiment 2.
Figure 10:
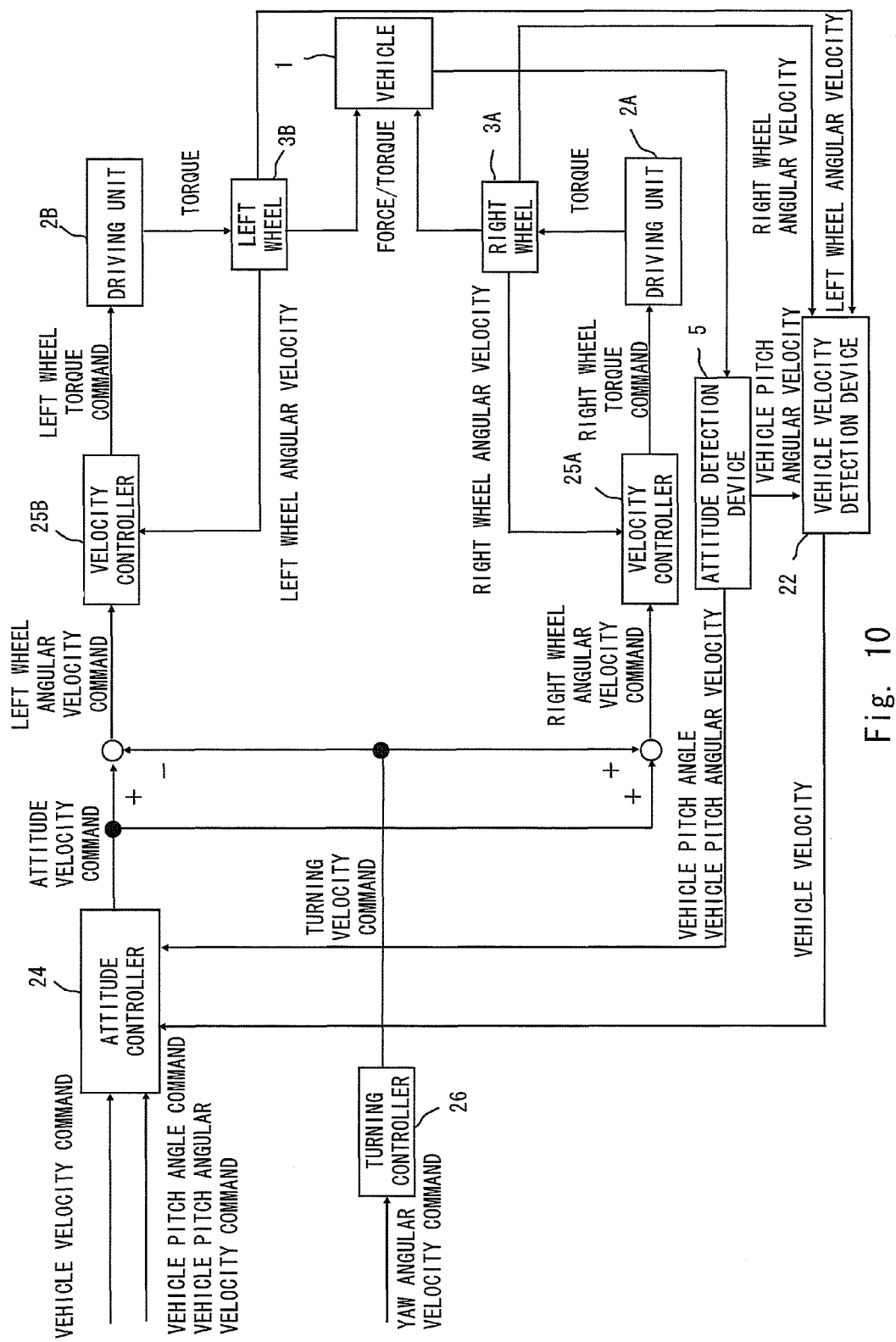
FIG. 10 is a control block diagram showing a structure of the operation control system of the coaxial two-wheel vehicle according to Embodiment 2.
Figure 11:
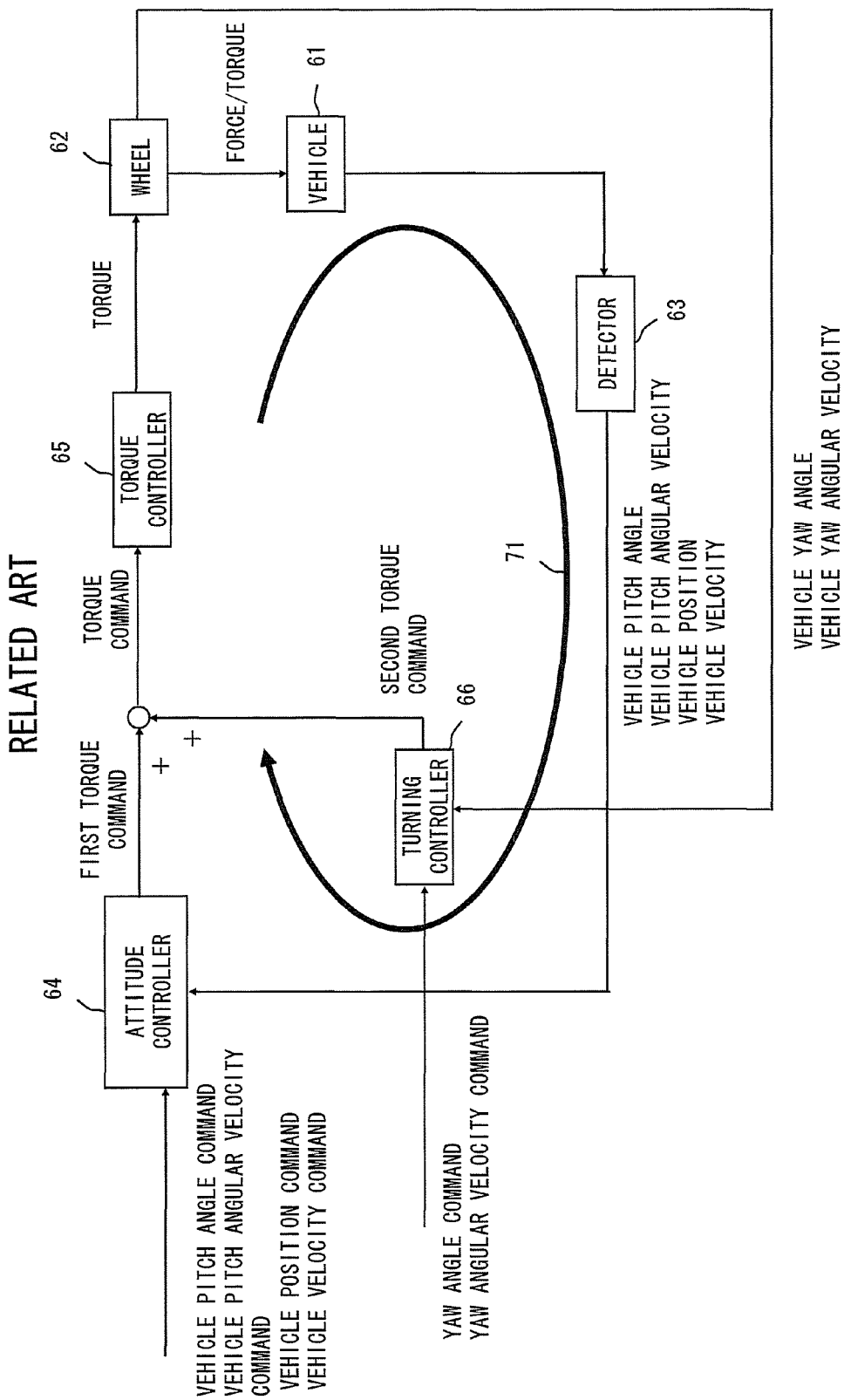
FIG. 11 a control block diagram showing a control system of a related coaxial two-wheel vehicle.
Figure 12:
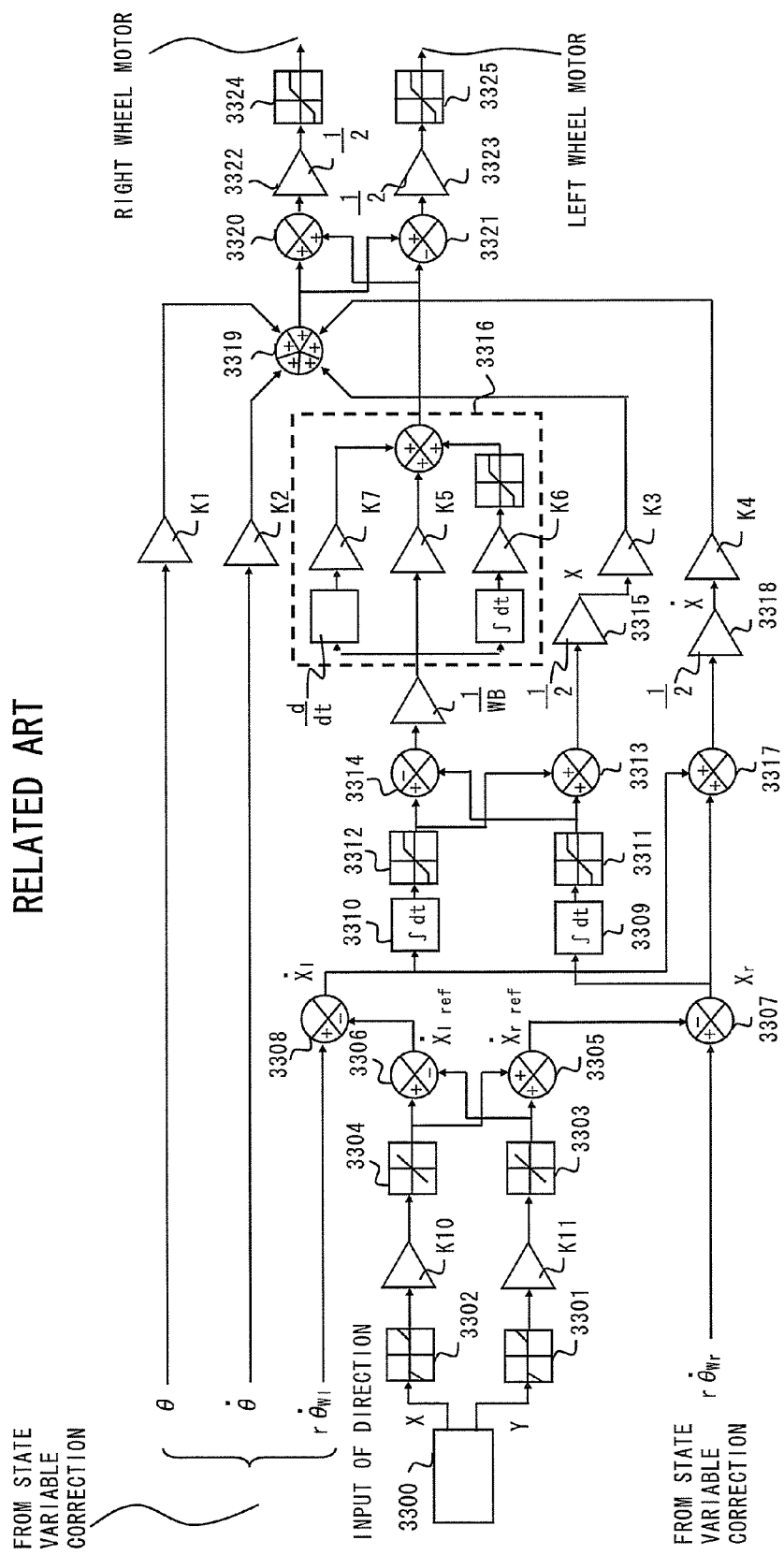
FIG. 12 a control block diagram showing a control system of a related coaxial two-wheel vehicle.

Hereinafter, with reference to FIG. 9 and FIG. 10, the operation control of the vehicle will be described in detail. FIG. 9 is a control block diagram showing an operation control system of the coaxial two-wheel vehicle according to Embodiment 2. FIG. 10 is a diagram for more specifically explaining the driving units 2A and 2B and the wheels 3A and 3B in the operation control system shown in FIG. 9. Variables used in the following explanation are the same as those explained in Embodiment 1 described above, and therefore their descriptions will be omitted herein. It should be noted that, in Embodiment 2, a description will be given on the operation control in a case where the vehicle velocity is decreased based on the operation of the brake lever and a velocity limitation, so at least one of the vehicle pitch angle command, the vehicle pitch angular velocity command, and the vehicle velocity command are input to an attitude controller 24.

In FIG. 9, the driving unit 2 separately drives the plurality of wheels 3 that are coaxially disposed. The driving unit 2 includes the motor and the amplifier for driving the respective wheels 3, and performs torque control in response to a torque command to be input. The torque is applied to the wheels 3 along with the rotation of the motor. Further, a reaction force of the torque is applied to the vehicle main body 1 along with the rotation of the motor, and a reaction force from the ground is applied to the main body 1 along with the rotation of the wheels 3.

A wheel angular velocity detector (not shown) detects a wheel angle and a wheel angular velocity as a relative angle and a relative angular velocity between the main body 1 and the plurality of wheels 3. The wheel angular velocity detector detects the wheel angle and the wheel angular velocity from encoder information provided on a rotation shaft of the motor, for example.

The attitude detection device 5 detects the vehicle pitch angle and the vehicle pitch angular velocity of the main body 1. The attitude detection device 5 detects the vehicle pitch angle and the vehicle pitch angular velocity by using a gyro sensor or an acceleration sensor. It should be noted that a description is given on the assumption that the attitude detection device 5 detects both the vehicle pitch angle and the vehicle pitch angular velocity but the attitude detection device 5 may detect only the vehicle pitch angle or only the vehicle pitch angular velocity.

The vehicle velocity detection device 22 obtains a current vehicle velocity from the wheel angular velocity detected by the wheel angular velocity detector and the vehicle pitch angular velocity detected by the attitude detection device 5. The current vehicle velocity is obtained by multiplying a difference between (or sum of) the vehicle pitch angular velocity and the wheel angular velocity by a wheel diameter. The vehicle velocity command setting device 23 determines a deceleration command (a Vref=f(B, B', x')) in accordance with a given function f from the outputs of the brake detection device 8 and the vehicle velocity detection device 22, and sets the vehicle velocity command (current x'r=latest x'−a Vref). The function f is a form as shown in f(B, B', x')=L1B+L2B'+L3x', for example. When a brake operation amount B, a brake operation velocity B', and a vehicle main body velocity x' are large, coefficients L1, L2, and L3 are determined so that a large deceleration command is obtained. It should be noted that depending on the way to determine the function f, it is also possible to give a different characteristic such that a large deceleration command is obtained when the vehicle main body velocity is small. In addition, when the vehicle velocity command becomes 0 or a negative value, the vehicle velocity command is set to 0.

The attitude controller 24 performs the attitude control so that the vehicle pitch angle and the vehicle pitch angular velocity that are detected by the attitude detection device 5 and the vehicle velocity detected by the vehicle velocity detection device 22 follow the vehicle pitch angle command and the vehicle pitch angular velocity command to be input and the vehicle velocity command determined by the vehicle velocity command setting device 23. That is, the attitude controller 24 generates the attitude velocity command and performs control regarding the attitude velocity command based on the vehicle pitch angle and the vehicle pitch angular velocity that are detected by the attitude detection device 5, the vehicle velocity detected by the vehicle velocity detection device 22, the vehicle pitch angle command and the vehicle pitch angular velocity command that are input, and the vehicle velocity command determined by the vehicle velocity command setting device 23.

More specifically, the attitude controller 24 obtains differences between the vehicle pitch angle command βr, the vehicle pitch angular velocity command β'r, and the vehicle velocity command x'r to be input and the vehicle pitch angle β, the vehicle pitch angular velocity β', and the vehicle velocity x' that are detected, respectively, and performs state feedback control so that the differences converge into 0. Generally, the values of the vehicle pitch angle command βr and the vehicle pitch angular velocity command β'r are input as 0, and attitude control is performed so that the vehicle pitch angle β and the vehicle pitch angular velocity β' that are caused due to the shift of the center of gravity by the passenger are maintained at 0. The attitude controller 24 calculates the attitude velocity command by using the following expression (5). In the expression (5), K1, K2, and K3 each represent a gain. Here, during normal traveling, the vehicle velocity detected by the vehicle velocity detection device 22 is input as the vehicle velocity command. As a result, a term value relating to K3 becomes 0, and therefore the acceleration or deceleration according to the shift of the center of gravity can be preferably performed. When the brake lever is operated, the vehicle velocity command x'r is reduced as compared to the current vehicle velocity x', with the result that preferable deceleration can be performed.

$$\text{Attitude velocity command}=K1(\ominus r-\beta)+K2(\beta'r-\beta')+K3(x'r-x') \quad (5)$$

Depending on the control gains, a following performance of the motor that responds to the vehicle pitch angle command βr, the vehicle pitch angular velocity command β'r, and the vehicle velocity command x'r is changed. For example, if the gain K1 is reduced, a motor rotor moves with a slow following delay. Meanwhile, if the gain K1 is increased, the motor rotor shows a high-speed following performance. As described above, by changing the control gains, it is possible to adjust a response time with respect to degrees of the differences between the vehicle pitch angle command βr, the vehicle pitch angular velocity command β'r, and the vehicle velocity command x'r and the vehicle pitch angle β, the vehicle pitch angular velocity β', and the vehicle velocity x' that are actually detected, respectively. It should be noted that in the attitude controller 24, the control is not limited to the state feedback control and may instead be H infinity control, fuzzy control, or the like.

In the same way as in the Embodiment 1 described above, a turning controller 26 generates a turning velocity command based on the yaw angular velocity command to be input. The yaw angular velocity command is input by using the turning operation device 6 described above.

The attitude velocity command generated by the attitude controller 24 and the turning velocity command generated by the turning controller 26 are added by an adder (or subtracted by a subtractor), and the obtained value is input as the wheel angular velocity command to a velocity controller 25. In a case where the wheel angular velocity command is generated to the right wheel 3A and the left wheel 3B as shown in FIG. 10, the angular velocity commands for the left wheel and the right wheel are calculated based on the attitude velocity command obtained from the expression (5) and the turning velocity command obtained from the expression (2) described in Embodiment 1.

The velocity controller 25 obtains differences between the wheel angular velocity commands to be input and the wheel angular velocities detected by the wheel angular velocity detector, performs the PI (proportional integral) control so that the differences converge into 0, and performs velocity control so that a detection value coincides with the command value. That is, the velocity controller 25 generates torque commands for the plurality of wheels 3 based on the wheel angular velocity commands to be input and the wheel angular velocities detected by the wheel angular velocity detector and outputs, to the driving unit 2, the torque commands thus generated. The velocity controller 25 performs the simple PI control or PD control based on the encoder information of the motor, with the result that a sufficiently high-speed control cycle can be realized by a low-cost CPU.

By using the control system described above, not only the attitude control in accordance with the shift of the weight of the passenger and the turning control in accordance with the operation by the passenger or the shift of the weight thereof but also the vehicle velocity control in accordance with the brake operation by the passenger and the velocity control in the case where the vehicle velocity limit is exceeded can be carried out at the same time.

As described above, according to the present invention, the control system by the velocity controller capable of increasing the speed at a low cost is configured in the control loop within the control system by the attitude controller, with the result that the attitude control, the turning control, and the vehicle velocity control that provide high performance can be realized at the same time while reducing the cost of the entire system and the controls providing higher performance can be performed.

Further, the control system by the velocity controller is operated by the subordinate controller that provides higher-speed performance than the controller that performs the attitude control by the attitude controller, with the result that the high robustness with respect to the load variation can be realized. Because the turning velocity command is given as a feed forward, the stability in the traveling direction is improved, and therefore a stable traveling can be provided even in the case where one of the wheels is away from the road surface during traveling.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A movable body comprising:
   a drive device that drives a movable body;
   a drive velocity detector that detects a drive velocity of the drive device;
   an operation state detector that detects an operation state including attitude information of the movable body;
   an attitude controller that generates a drive velocity command based on the attitude information detected by the operation state detector and an attitude information command to be input so that the attitude information detected follows the attitude information command to be input; and
   a velocity controller that generates a torque command of the drive device based on the drive velocity command generated by the attitude controller and the drive velocity detected by the drive velocity detector, the velocity controller being disposed subordinately with respect to the attitude controller, wherein the movable body moves by driving the drive device in accordance with the torque command generated by the velocity controller, the velocity controller performs velocity control so that the drive velocity detected by the drive velocity detector follows the drive velocity command generated by the attitude controller, a control cycle of the velocity control by the velocity controller is of a higher speed than a control cycle of the attitude control by the attitude controller, and a turning controller that generates a turning velocity command based on a turning information command to be input, the turning controller including no feedback of turning information, the drive device moves the movable body in one of forward and backward directions based on a movement of a center of gravity due to a movement by a passenger in one of the forward and backward directions, wherein the drive velocity command generated by the attitude controller is adjusted by the turning velocity command through addition or subtraction, and wherein the velocity controller performs velocity control so that the drive velocity detected by the drive velocity detector follows the drive velocity command generated.

2. The movable body according to claim 1, further comprising a velocity information command setter that sets a velocity information command, wherein the operation state detector detects the operation state including velocity information and the attitude information of the movable body, the velocity information command setter sets the velocity information detected by the operation state detector as the velocity information command, and the attitude controller generates the drive velocity command based on the attitude information detected and the velocity information command set by the velocity information command setter.

3. The movable body according to claim 2, wherein the velocity information command setter changes, when the velocity information detected by the operation state detector exceeds a predetermined velocity limit range, the set velocity information command in accordance with the velocity information detected by the operation state detector.

4. The movable body according to claim 2, further comprising a brake lever, wherein the velocity information command setter changes, when the brake lever is operated, the set velocity information command in accordance with an operation amount of the brake lever and the velocity information detected by the operation state detector.

5. A travel device comprising:

a driving unit that separately drives a plurality of wheels that are coaxially disposed;

a main body that connects the plurality of wheels;

a wheel angular velocity detector that detects a relative angular velocity between the main body and the plurality of wheels as a wheel angular velocity;

an attitude detector that detects at least one of an attitude angle and an attitude angular velocity as attitude information of the main body;

an attitude controller that generates a wheel angular velocity command based on the attitude information detected by the attitude detector and an attitude information command to be input so that the attitude information detected follows the attitude information command to be input;

a velocity controller that generates a torque command of each of the plurality of wheels based on the wheel angular velocity command generated by the attitude controller and the wheel angular velocity detected by the wheel angular velocity detector so that the wheel angular velocity detected by the wheel angular velocity detector follows the wheel angular velocity command generated, the velocity controller being disposed subordinately with respect to the attitude controller, and a turning controller that generates a turning velocity command based on a turning information command to be input, the turning controller including no feedback of turning information, wherein a control cycle of the velocity control by the velocity controller is of a higher speed than a control cycle of the attitude control by the attitude controller, wherein the driving unit includes a motor that is driven in accordance with the torque command generated by the velocity controller, to travel the travel device, and wherein the driving unit moves the travel device in one of forward and backward directions based on a movement of a center of gravity due to a movement by a passenger in one of forward and backward directions, wherein the wheel angular velocity command generated by the attitude controller is adjusted by the turning velocity command through addition or subtraction, and wherein the velocity controller performs velocity control so that the wheel angular velocity detected by the wheel angular velocity detector follows the wheel angular velocity command generated.

6. The travel device according to claim 5, further comprising:

a vehicle velocity detector that detects a vehicle velocity of the travel device based on the wheel angular velocity of the plurality of wheels that is detected by the wheel angular velocity detector and the attitude angular velocity detected by the attitude detector; and a vehicle velocity command setter that sets a vehicle velocity command, wherein the vehicle velocity command setter sets the vehicle velocity detected by the vehicle velocity detector as the vehicle velocity command, and the attitude controller generates the wheel angular velocity command based on the attitude information detected and the vehicle velocity command set by the vehicle velocity command setter.

7. The travel device according to claim 6, wherein the vehicle velocity command setter changes, when the vehicle velocity detected by the vehicle velocity detector exceeds a predetermined velocity limit range, the set vehicle velocity command in accordance with the vehicle velocity detected by the vehicle velocity detector.

8. The travel device according to claim 6, further comprising a brake lever, wherein the vehicle velocity command setter changes, when the brake lever is operated, the set vehicle velocity command in accordance with an operation amount of the brake lever and the vehicle velocity detected by the vehicle velocity detector.

* * * * *

UNITED STATES PATENT AND TRADEMARK OFFICE
CERTIFICATE OF CORRECTION

PATENT NO.        : 8,738,259 B2
APPLICATION NO.   : 12/511528
DATED             : May 27, 2014
INVENTOR(S)       : Y. Kosaka Page 1 of 1

It is certified that error appears in the above-identified patent and that said Letters Patent is hereby corrected as shown below:

In the Specification

At column 11, line 32, change "Γ'r" to -- Y'r --.

At column 15, line 30, change
"Attitude velocity command = $K1(\Theta r-\beta)+K2(\beta'r-\beta')+K3(x'r-x')$" to
-- Attitude velocity command = $K1(\beta r-\beta)+K2(\beta'r-\beta')+K3(x'r-x')$ --.

Signed and Sealed this
Thirtieth Day of December, 2014

Michelle K. Lee
*Deputy Director of the United States Patent and Trademark Office*